UNITED STATES PATENT OFFICE.

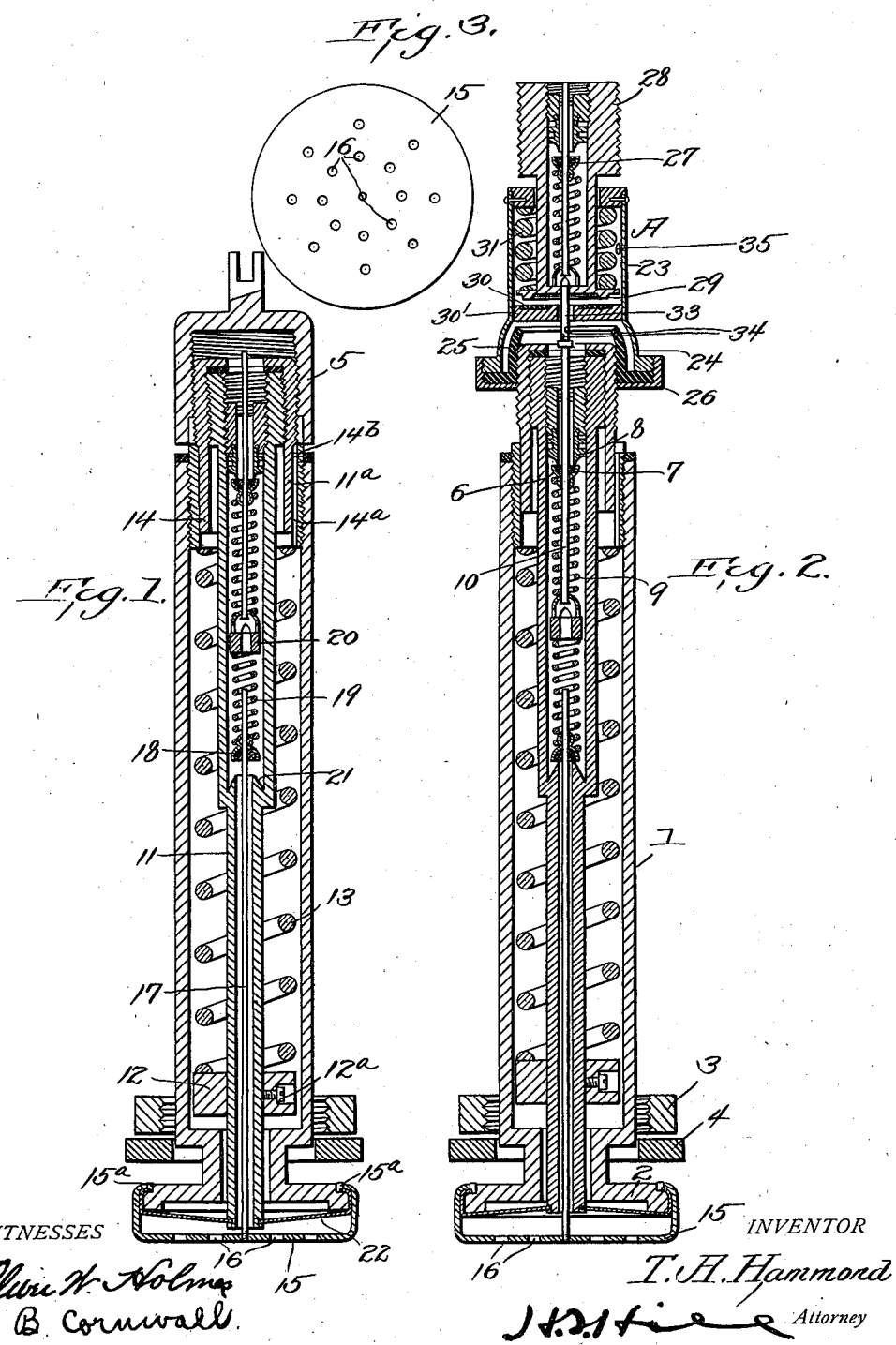

THEODORE A. HAMMOND, OF PASSAIC, NEW JERSEY, ASSIGNOR OF ONE-HALF TO WILLIAM P. HAMMOND, OF PASSAIC, NEW JERSEY.

PRESSURE-REGULATOR.

1,296,657.  Specification of Letters Patent.  Patented Mar. 11, 1919.

Application filed October 10, 1912. Serial No. 724,984.

*To all whom it may concern:*

Be it known that I, THEODORE A. HAMMOND, citizen of the United States, residing at Passaic, in the county of Passaic and State of New Jersey, have invented certain new and useful Improvements in Pressure-Regulators, of which the following is a specification.

My invention comprehends a pressure regulator and has for its object to provide a device of this character which is specially adapted for pneumatic tires as used on automobiles, but which is also adaptable for use in connection with any fluid-pressure receiving and containing apparatus by which the exact pressure within the tire or other apparatus may be regulated, and which, as in the case of pneumatic tires, may be a permanent attachment; further to provide an absolutely effective device of this description which will be simple in construction and inexpensive in the cost of manufacture.

It has come to be a well recognized fact that the pneumatic tires used on automobiles should be inflated to definite pounds pressure per square inch; the degree of pressure being determined by and commensurate with the size of the tire and the weight of the vehicle to be sustained thereby. Each tire, therefore, of a given size, should be inflated to its proper degree of pressure in order that the tire should not be subjected to unnecessary wearing or a possible destruction by reason of over or under inflation. Over-inflation stretches the tire fabric and unnecessarily destroys the very resiliency which a pneumatic tire is designed to give in order to afford smooth and comfortable riding, as well as subjects the vehicle and its mechanism to unnecessary shocks and jolts when passing over obstructions or inequalities in the road bed. Under-inflation is equally destructive, and in fact it has been said that deterioration is from three to five times more rapid in the latter case than in the former, as under-inflation causes the arch or walls of the fabric to break down, rim cut and often the total destruction of the tire takes place.

Heretofore, it has been customary to measure the amount of pressure within the tire by the use of separate and detachable pressure gages which are applied to the valve casing either before, during or after the inflation process. These gages, as generally made, are constructed so as to indicate varying pressures, in order that they might be used in connection with tires of different sizes which are inflated to different and various degrees of pressure. The objection to the use of these gages is that in order to secure proper inflation, a user must first know and subsequently remember the exact degree of pressure which both the front and rear tires of the automobile must be inflated to and it being a separate and detachable instrument, it is very apt to either get lost or misplaced. A further objection may be mentioned; that is, through carelessness or hurry, there is a possibility of the gage not being made use of at all, the owner being content to trust his judgment by kicking or feeling of the tire.

My invention obviates all of these difficulties and objections, and consists in incorporating a pressure-regulator in and as a part of the ordinary inflation mechanism of the tire as now used, so that each valve inflating mechanism will be provided with a regulator that will operate upon the attainment of the definite predetermined pressure required within the tire to which it is attached, to prevent excess of fluid pressure therein.

To the accomplishment of these objects, as well as others which will manifest themselves upon the reading of the following specification, I will proceed to describe one preferable embodiment of the invention which has been illustrated in the annexed drawings.

Referring to the drawings, Figure —1— is a vertical longitudinal section of this embodiment of my invention especially adapted for use in connection with a pneumatic tire, showing the pressure regulator valve in initial or open position.

Fig. —2— is a similar view showing the pressure regulator valve in final or closed position, and also illustrates a form of blow-off attachment.

Fig. —3— is a bottom plan view of the perforated support for the regulator valve rod.

While I have developed my invention in the form particularly adaptable to pneumatic tires, and which I desire to cover by my patent in addition to its broad or general features, those features of my device that are of special importance in relation to pneumatic tires, I illustrate in the drawings, and shall describe such an embodiment of my invention with the distinct understanding that I do not hereby restrict myself in the embodiment of the broad features thereof to its use in connection with pneumatic tires or any fluid pressure containing or receiving apparatus.

In developing my invention for and adapting it to a pneumatic tire, I use it in connection with or make it a part of the valve mechanism through which air is injected into the tire, and therein retained, and I retain the cylindrical stem or casing —1— commonly used with valves of automobile tires, the same being provided with two flat sides which engage similar flat surfaces of the rim through which it projects to prevent any rotary movement thereof.

The valve casing —1— has an enlargement or foot —2— that engages the interior wall of the tire and together with the nut —3— and plate —4— on the outside of the tire constitutes a clamp for the attachment of the mechanism to the tube. I also retain the usual cover or cap —5— as well as the usual air check valve mechanism —6—; the valve mechanism —6— as shown being of well known construction, and consisting of a valve head —7— which is yieldingly held to a valve seat —8— by a coil spring —9—, and which has a stem —10— that protrudes beyond the outer end of the valve casing, so that pressure upon the protruding end of the stem will cause the valve —7— to be moved from its seat to permit the discharge of air from within the tire. Valve —8— is normally closed to prevent egress of air from within the tire, but yields inwardly to permit the ingress of air thereto in the well known manner.

The valve mechanism just described is movably mounted in the casing —1—, the mounting being within and at one end of a tube —11— which extends through the casing —1— into the tire and which serves as an induct for the fluid to the interior of the tire. The end of the tube —11— at which the mechanism is mounted, is internally threaded, the valve mechanism being screwed therein, and removable therefrom when required to permit of the insertion of a new valve mechanism. This end is also externally threaded and upon the external threads is screwed a sleeve —11ª—, upon which the cap —5— is screwed. The lower extremity of the sleeve —11ª— has a sliding contact with a collar —14—, which is in screw threaded engagement with the outer casing —1—. The collar —14— is slotted at —14ª— to receive a pin —14ᵇ— mounted in and carried by the sleeve —11ª—, both slot and pin serving the purpose of preventing any rotary movement of the tube —11— so as to prevent the transmission of any strain to the point of its connection with the diaphragm.

A collar —12— is mounted or keyed to the tube —11— by means of suitable screws —12ª—, serving to support one end of the spring —13—. The other end of the spring —13— abuts the collar —14— and as will be apparent, the spring opposes the outward longitudinal movement of the interior tube —11—.

Mounted upon the foot —2— and suitably fastened thereto is a valve rod support —15— provided with perforations —16—. Upon this support and projecting through the bore of the interior tube —11— is a valve rod —17— having rigidly mounted thereon a valve head —18— heretofore described, which has a leather bushing or disk embedded in a metal frame so as to form a hermetical seal at the point of its contact with the valve seat. A spring —19— and a washer —20— are interposed between the valves —7— and —18— and serve as a support for the valve —7— to keep it normally in closed position. —21— indicates a valve seat similar to the valve seat —8— heretofore described. This valve seat is provided within and preferably is made a part of the induct tube —11—, and coöperates with the valve —18— in the manner hereafter described. Extending across and in peripheral engagement with the foot —2— and fastened to the tube —11—, I provide a diaphragm —22—, which may be, and preferably is made of thin metal. The peripheral edge of the diaphragm is turned and clamped over the edge of the foot —2— between it and the valve rod support —15— as shown. In order to form a hermetical seal the connection between the diaphragm —15— and the foot —2— is soldered at —15ª—.

It will be clear from the description thus far that any pressure that might be applied to the diaphragm —22— will tend to move the inner tube —11— in opposition to the tension of the spring —13—, and thus force the seat —21— toward the valve —18—. Assuming by way of example, that the spring —13— is gaged or calibered to a certain amount of movement under a pressure of 80 pounds (such movement being equal to the distance between the valve seat —21— and the valve —18—), it will be manifest that as soon as a pressure of 80 pounds is exerted upon the diaphragm —22— from within the tire, the diaphragm will give and move the tube —11— longitudinally outward until the valve seat —21— engages or abuts the valve —18—. Now supposing that the tire is being inflated by means of a pump or other source of supply, connections with which is made by a hose or pipe screwing on or slipping over the sleeve —11ᵃ—, the entering fluid will unseat the valve —7— and enter the tire through tube —11—. As the pressure builds up and approaches the desired degree within the tire, the valve seat —21— moving longitudinally outward by reason of the pressure on the diaphragm —22— approaches the valve —18— and by the time the predetermined pressure is developed within the tire the valve —18— and seat —21— will have engaged one another and closed the communication through the tube —11— (see Fig. 2). As soon as the valve —18— is closed, the pressure will back up in the pump (when one is used) and render it inoperative and thus a user is notified that the tire has received its proper inflation.

Thus it is seen that by the use of my invention, it is utterly impossible to over-inflate a tire which may be equipped with it. At the same time, the user will always know that so long as he is able to operate his pump, there is insufficient pressure within the tire and that it is necessary for him to proceed with the inflation until it becomes impossible to move or operate the pump.

Through the use of my invention, a tire manufacturer is enabled to exercise a control over the use which tires of his manufacture may be subjected to, and the common abuse of tires due to improper inflation will be greatly minimized if not entirely eliminated, as it will not remain for the user to exercise the discretion or judgment heretofore required as an important guide and check is hereby placed upon the future acts of the user during tire inflation.

The cap —5— serves to lock the regulator valve —18— in closed position, as will be presently understood. It will be noted that when the valve seat —21— is approaching the valve —18— the valve mechanism —6— is moving outward by reason of its mounting within the tube —11—. Now, when the regulator valve —18— is closed, and the pump or other supply connection is removed, the cap —5— is screwed upon the sleeve —11ᵃ— until it abuts the end of the casing —1—, in which position it firmly locks and holds the regulating valve —18— to its seat, and no matter what depreciation of pressure within the tire that may take place through leakage in the tire tube, none of the pressure will be permitted to escape through the valve mechanism by reason of the same being firmly held to its seat through the mechanical action of this cap —5— as described. Irrespective of the use of this feature in this described embodiment, the mechanical operation of this valve may be employed as such in connection with tire valves as heretofore used, eliminating the automatic feature of interrupting the communication through the tube —11— by the pressure from within the tire; that is to say, a sufficiently strong spring or diaphragm may be used that will insure an open position of the valve —18— under any amount of pressure that ordinarily will be injected into the tire. This would permit the use of a separate gage to measure the amount of pressure within the tire at any time. When the tire has had its proper amount of inflation, the cap —5— when screwed on will raise the valve seat —21— mechanically and by engagement with the valve —18— close the induct or port through the tube —11—, and thereby prohibit the fluid from escaping therethrough. This feature is emphasized for the reason that it effectively prevents any leakage through the small tire valve —6— which heretofore has been a very common experience as it has been almost impossible to effectively seal by means of the rubber bushings used, the points of contact between the valve parts themselves and the casing in which they are mounted. As a secondary precaution, to prevent such leakage, the cap —5— as heretofore used; has been provided with a rubber cup shaped disk or washer, which when the cap is applied to the casing, is forced down against the casing rim to form a mechanical seal therebetween. No rubber is required in the cap —5—, as I employ it.

When the source of fluid supply is a compressed air tank, I simply use the blow-off attachment A to notify, by the sound of the escaping fluid when the valve —18— has closed sufficiently to prevent the further passage of fluid into the tire.

This blow-off attachment acts also as a safety valve, and prevents the rubber hose or tubing leading from the source of supply to the valve from bursting through over internal pressure.

The attachment A consists of a casing —23— having a curved or conically formed base —24—. Within the base —24— is provided a rubber cup shaped gasket or washer —25— which is retained and held in place within the base by means of a screw-threaded collar —26—, which screws on a threaded flange of the base. A tube —28— leads to the casing —23—, and movably mounted within the said tube —28— is a valve mechanism —27— identical in construction with the valve mechanism —6— heretofore described. The end of the tube —28— is provided with an annular projecting ridge —29— constituting a valve, the same being adaptable normally to engage against a rubber seat —30— mounted in a plate —30′— fast to the casing —23—. A spring —31— interposed between a collar —32— and the valve —29— tends to normally seat the valve. Projecting from the lower end of the casing —23—is a hollow pin or tube —33— which is provided with side openings —34—. The pin —33— projects low enough to engage the valve stem of the valve mechanism —6— when the device is slipped over the tire valve, and unseats the valve —7— to permit the back pressure of fluid from the tire to be exerted against the valve —29— to unseat it when the pressure becomes high enough to overcome the tension of the spring —31—. The fluid then escapes through a port —35— provided in the casing —23— for the purpose of notifying the user that the valve —18— is closed.

It will be understood that the spring —31— is of greater tension than the spring —13— of the tire valve, and requires a greater pressure to compress it in order that it will not permit the valve —29— to unseat until the valve —18— is closed and the required pressure is obtained within the tire.

The attachment A may conveniently be permanently attached to and made a part of the tube of the inflating apparatus and slipped over the tire valve when the inflation of the tire is required.

Having thus described the invention, what I claim as new and desire to secure by Letters Patent, is:—

1. The combination of a fluid pressure container, an inflation tube for the container, an induct tube movably mounted within the inflation tube, a diaphragm carrying the induct tube and exposed to the action of the pressure within the container, a valve and a valve seat within the induct tube, one of the valve members being carried by the induct tube, and means for mounting the opposite valve member independently of the induct tube, the movement of the diaphragm and induct tube operating to automatically close the valve when the pressure within the container reaches a predetermined point.

2. The combination of a fluid pressure container, an inflation tube for the container, an induct tube movably mounted within the inflation tube, a diaphragm carrying the induct tube and exposed to the action of the pressure within the container, a valve seat and valve member within the induct tube, one of the valve members being mounted upon the induct tube, means for mounting the opposite valve member independently of the induct tube, the movement of the diaphragm and induct tube operating to close the valve when the pressure within the container reaches a predetermined point, and means for locking the induct tube to hold the valve in a closed position.

3. The combination of a fluid pressure container, an inflation tube for the container, an induct tube slidably mounted within the inflation tube, a diaphragm carrying the induct tube and exposed to the action of the pressure within the container, a valve and valve seat within the induct tube, one of the valve members being carried by the induct tube, means for mounting the opposite valve member independently of the induct tube, the movement of the diaphragm and induct tube serving to close the valve when the pressure within the container reaches a predetermined point, and a cap adapted to be applied to the induct tube and to engage the inflation tube to hold the valve in a closed position.

In testimony whereof I affix my signature in presence of two witnesses.

THEODORE A. HAMMOND.

Witnesses:
 CHAS. LYON RUSSELL,
 W. P. HAMMOND.